Figure 1:
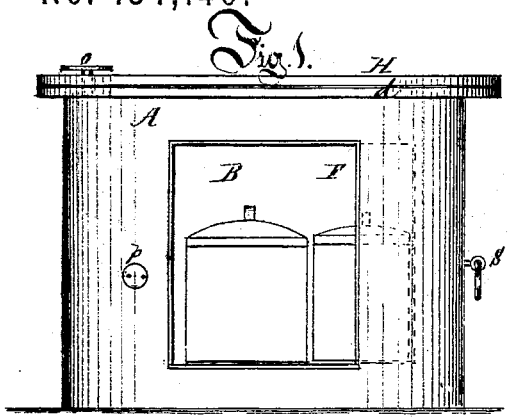
Figure 2:
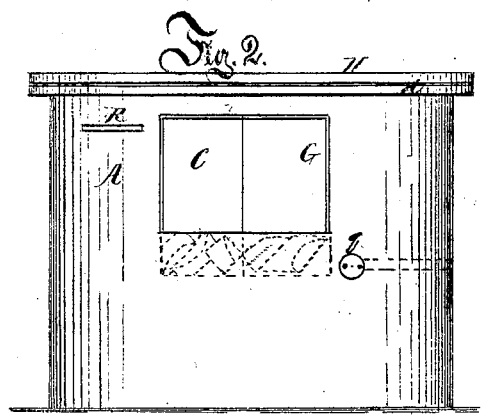
Figure 3:
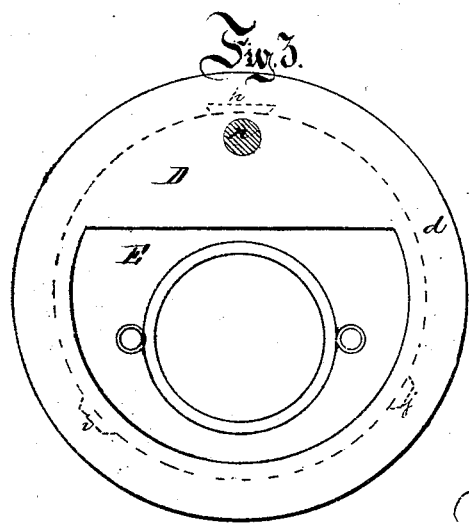
Figure 4:
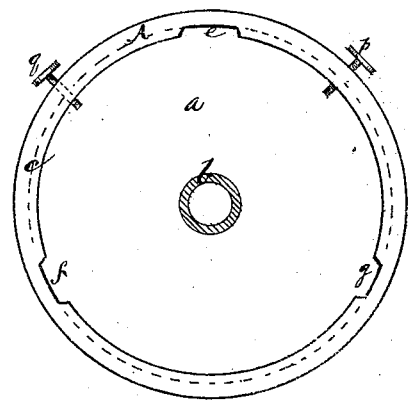
Figure 5:
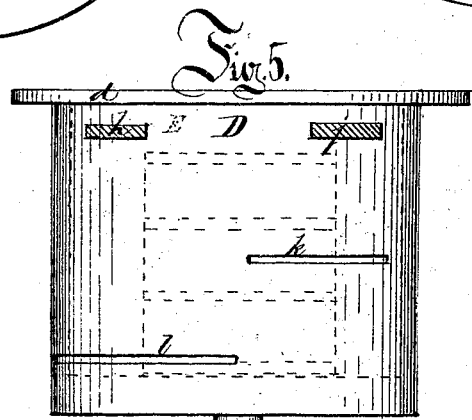

T. H. KANE.
Receptacles.

No. 134,146. Patented Dec. 24, 1872.

Witnesses: Richard Gerver, Franklin Jarrett

Inventor: Thomas H. Kane
per Henry Gerver, Atty

AM. PHOTO-LITHOGRAPHIC CO. N.Y. (OSBORNE'S PROCESS.)

UNITED STATES PATENT OFFICE.

THOMAS H. KANE, OF NEW YORK, N. Y.

IMPROVEMENT IN RECEPTACLES.

Specification forming part of Letters Patent No. 134,146, dated December 24, 1872.

*To all whom it may concern:*

Be it known that I, THOMAS H. KANE, of the city, county, and State of New York, have invented certain Improvements in Receptacles for ash boxes or barrels, letters, packages, milk-kettles, &c., of which the following is a specification:

The object of my invention is to provide for a substantial receptacle, made by preference of cast-iron, to be placed on the sidewalk, and, if desired, secured to the same, for the reception and safe keeping of ash barrels or boxes, milk-kettles, letters, packages, &c., serving at the same time as a carriage-step and a hitching-post for horses.

In order to describe my invention more fully I refer to the accompanying drawing forming a part of this specification.

Figure I is a side view of a receptacle embodying my invention, representing the partition for the reception of milk-kettles, &c. Fig. II is a side view of the same, showing the partition for the reception of letters, packages, &c. Fig. III is a plan view of the receptacle with the top lid removed, showing the partition for the reception of ash and refuse barrels. Fig. IV is a detached plan view of the outer casing. Fig. V is a detached side view of the inner casing.

A is a cylindrical casing with the bottom $a$, in the center of which is placed a journal, $b$. In the upper rim $c$ are cut three grooves, $e, f$, and $g$, of three different sizes. In the side of this casing are cut two openings—B the larger one, and C the smaller. A small slit, R, is also cut in the side. D is a cylindrical vessel or receptacle with a rim, $d$, on the top. In the interior of this vessel are three compartments—E, the largest, with its inlet in the top; F, the next larger; and G the smallest, both in the side. To the outer side, under the rim $d$, are fastened three buttons, $h, i$, and $j$, of sizes to correspond with the aforementioned grooves $e, f$, and $g$. On the outer side are also cut two longitudinal grooves, $k$ and $l$. To the center of the bottom is attached a pivot or axle, $m$, which fits into the journal $b$. The receptacle D is covered with a movable lid, H, which is pivoted at $n$ to the rim $d$, and when closed is locked by aid of the lock-screw $o$.

The receptacle D being placed inside the casing A, by letting the buttons $h, i$, and $j$ drop into the corresponding grooves $e, f$, and $g$, it will be seen that the said receptacle revolves on its axis or pivot $m$ in either direction. By placing the inlet of the smaller compartment G opposite the smaller opening C admittance may be had to the interior of G, which contains letters or packages dropped in through the slit R. By placing the inlet of the larger compartment F opposite the larger opening B admittance may be had to the interior of the compartment F, which is intended for milk-kettles, &c. By aid of the lock-screws $p$ and $q$, having different keys, and the two longitudinal grooves $k$ and $l$, the letter-box may be opened separately and independently of the milk-kettle compartment, and vice versa. The compartment E with inlet in the top of D is intended for the reception of ash and refuse barrels. The movable lid H, being pivoted at $n$ to the rim $d$, covers this compartment, and is locked by aid of the lock-screw $o$, to which is also attached a separate key. The lid H serves also as a convenient carriage-step, while the rings S S fastened to the outside of the casing A are convenient mediums for the hitching of horses.

Having thus described my invention, I desire to claim—

The cylindrical casing A with journal $b$, rim $c$, grooves $e, f$, and $g$, openings B and C, and slit R, in combination with the cylindrical vessel D with the rim $d$, compartments E, F, and G, buttons $h, i$, and $j$, grooves $k$ and $l$, pivot $m$, lid H, and lock-screws $o$, $p$, and $q$, substantially as and for the purpose hereinbefore set forth.

THOS. H. KANE.

Witnesses:
RICHARD GERNER,
C. L. EVERT.